(12) United States Patent
Hirohara (10) Patent No.: US 7,932,903 B2
(45) Date of Patent: Apr. 26, 2011

(54) IMAGE PROCESSOR, IMAGE PROCESSING METHOD AND INFORMATION STORAGE MEDIUM

(75) Inventor: Syuichi Hirohara, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 917 days.

(21) Appl. No.: 11/816,809

(22) PCT Filed: Dec. 21, 2005

(86) PCT No.: PCT/JP2005/023528
§ 371 (c)(1),
(2), (4) Date: Aug. 21, 2007

(87) PCT Pub. No.: WO2006/090526
PCT Pub. Date: Aug. 31, 2006

(65) Prior Publication Data
US 2009/0015581 A1    Jan. 15, 2009

(30) Foreign Application Priority Data
Feb. 22, 2005  (JP) ................................. 2005-046143

(51) Int. Cl.
*G06T 15/00*  (2006.01)
(52) U.S. Cl. ........ 345/419; 345/619; 345/502; 345/473; 709/231; 709/233; 704/9
(58) Field of Classification Search .................. 345/419, 345/502, 619, 473, 474, 475; 709/231, 232, 709/233; 704/9
See application file for complete search history.

(56) References Cited

U.S. PATENT DOCUMENTS
5,675,721 A * 10/1997 Freedman et al. ............ 345/502
(Continued)

FOREIGN PATENT DOCUMENTS
EP     0999524 A1    5/2000
(Continued)

OTHER PUBLICATIONS

Thomas A. Funkhouser, et al., Adaptive Display Algorithm for Interactive Frame Rates During Visualization of Complex Virtual Environments, Siggraph Conference Proceedings, XX,XX, Jan. 1, 1993, pp. 247-254.

*Primary Examiner* — Phu Nguyen
(74) *Attorney, Agent, or Firm* — Sughrue Mion, PLLC (57) ABSTRACT

To increase the number of object for which position, posture, and so forth are regularly updated even when a viewpoint position and a viewing direction are constantly changed in a virtual three-dimensional space, while keeping deterioration in smoothness of a display image unnoticeable. An image processor for producing and displaying a display image showing a picture obtained by viewing a virtual three-dimensional space where a viewpoint and a plurality of display target objects are disposed, from the view point, comprises an object selection unit (66) for calculating a display size, in the display image, of each of the plurality of display target objects and selecting some of the plurality of display target objects based on the calculated display size of each of the plurality of display target objects, and a state update unit (68) for updating a state of the objects selected by the object selection unit (66) in the virtual three-dimensional space at a time interval different from that for other objects in the virtual three-dimensional space.

20 Claims, 10 Drawing Sheets

U.S. PATENT DOCUMENTS

| | | | |
|---|---|---|---|
| 6,118,456 A * | 9/2000 | Cooper | 345/619 |
| 6,268,869 B1 | 7/2001 | Ugajin et al. | |
| 6,400,372 B1 * | 6/2002 | Gossweiler et al. | 345/619 |
| 6,570,563 B1 * | 5/2003 | Honda | 345/419 |
| 6,674,437 B1 * | 1/2004 | Rose et al. | 345/473 |
| 6,684,255 B1 * | 1/2004 | Martin | 709/231 |
| 2003/0098863 A1 | 5/2003 | Fujita et al. | |
| 2004/0209688 A1 | 10/2004 | Mizuki et al. | |

FOREIGN PATENT DOCUMENTS

| | | |
|---|---|---|
| JP | 10-307905 A | 11/1998 |
| JP | 2001-70562 A | 3/2001 |
| JP | 2003-167659 A | 6/2003 |
| JP | 2004-318558 A | 11/2004 |

* cited by examiner

A ⋯OBJECT WITH UPDATE TIME INTERVAL 1/60 SECOND

B1⋯OBJECT IN UPDATE GROUP 1
    WITH UPDATE TIME INTERVAL 1/30 SECOND

B2⋯OBJECT IN UPDATE GROUP 2
    WITH UPDATE TIME INTERVAL 1/30 SECOND

| OBJECT ID | UPDATE TIME INTERVAL | UPDATE GROUP |
|---|---|---|
| 001 | 1/60 | – |
| 002 | 1/60 | – |
| 003 | 1/30 | 1 |
| 004 | 1/30 | 2 |
| 005 | 1/60 | – |
| 006 | 1/30 | 1 |
| 007 | 1/30 | 1 |
| 008 | 1/30 | 2 |

IMAGE PROCESSOR, IMAGE PROCESSING METHOD AND INFORMATION STORAGE MEDIUM

TECHNICAL FIELD

The present invention relates to an image processor, an image processing method, and an information storage medium, and in particular to a technique for displaying an image concerning an object disposed in a virtual three-dimensional space.

BACKGROUND ART

There is a widely known image processor for constructing a virtual three-dimensional space in a memory means of a computer, then disposing an object in the virtual three-dimensional space, and visualizing the picture of the space. With the device, the states of the objects, including the position, posture, and so forth thereof, disposed in the virtual three-dimensional space are updated at a predetermined time interval (for example, 1/60 or 1/30 second), so that an image showing the virtual three-dimensional space can be changed on a real time basis. In the above, however, it is difficult to update the states of many objects in a limited period of time, or 1/60 second. This difficulty is addressed by the device disclosed in the Japanese Patent Laid-open Publication No. Hei 10-307905 (see FIGS. 2 and 3), by sequentially excluding a predetermined unnoticeable object from images to be displayed.

DISCLOSURE OF THE INVENTION

Problems to be Solved by the Invention

The above-described related art, however, in which a predetermined unnoticeable object is sequentially excluded from images to be displayed, is not readily applied to a case in which a viewpoint position and a viewing direction are constantly changed in the virtual three-dimensional space.

The present invention has been conceived in view of the above, and aims to provide an image processor, an image processing method, and an information storage medium for increasing the number of objects for which positions, postures, and so forth can be regularly updated even when a viewpoint position and a viewing direction are constantly changed in a virtual three-dimensional space, while preventing deterioration in smoothness of a display image from being noticeable.

Means for Solving the Problems

In order to achieve the above-described object, according to one aspect of the present invention, there is provided an image processor for producing and displaying a display image showing a picture obtained by viewing a virtual three-dimensional space where a viewpoint and a plurality of display target objects are disposed, from the view point, comprising display size calculation means for calculating a display size, in the display image, of each of the plurality of display target objects; object selection means for selecting some of the plurality of display target objects based on the display size of each of the plurality of display target objects, calculated by the display size calculation means; and state update means for updating a state of the objects selected by the object selection means in the virtual three-dimensional space at a time interval different from that for other objects in the virtual three-dimensional space.

According to another aspect of the present invention, there is provided an image processing method for producing a display image showing a picture obtained by viewing a virtual three-dimensional space where a viewpoint and a plurality of display target objects are disposed, from the view point, comprising a display size calculating step of calculating a display size, in the display image, of each of the plurality of display target objects; an object selecting step of selecting some of the plurality of display target objects based on the display size of each of the plurality of display target objects, calculated at the display size calculating step; and a state update step of updating a state of the objects selected at the object selecting step in the virtual three-dimensional space at a time interval different from that for other objects in the virtual three-dimensional space.

According to still another aspect of the present invention, there is provided a computer readable information storage medium storing a program causing a computer to function as image display means for producing and displaying a display image showing a picture obtained by viewing a virtual three-dimensional space where a viewpoint and a plurality of display target objects are disposed, from the view point; display size calculation means for calculating a display size, in the display image, of each of the plurality of display target objects; object selection means for selecting some of the plurality of display target objects based on the display size of each of the plurality of display target objects, calculated by the display size calculation means; and state update means for updating a state of the objects selected by the object selection means in the virtual three-dimensional space at a time interval different from that for other objects in the virtual three-dimensional space.

Here, the computer may be, for example, a home-use game machine, a commercial game machine, a portable game machine, a personal computer, a portable data assistant, a portable phone, and so forth. The program may be stored in a computer readable information storage medium, such as a CD-ROM, a DVD-ROM, a ROM cartridge, and so forth.

According to the present invention, a viewpoint and a plurality of display target objects are disposed in a virtual three-dimensional space. A display image showing a picture obtained by viewing the virtual three-dimensional space from the viewpoint is produced, and displayed by displaying means, such as a home-use television set, a computer monitor, or the like. In the above, some of the plurality of display target objects are selected, and the position, posture, and so forth of the selected objects in the virtual three-dimensional space are updated at a certain time interval, while those of the other objects are updated at a different time interval. According to the present invention, an increased number of display target objects can be regularly updated as a whole. In addition, as the position, posture, and so forth of only limited objects are updated at a longer time interval, deterioration in smoothness of the display image can be made unnoticeable.

In particular, according to the present invention, a display size in a display image, of each of the plurality of display target objects, is calculated, and some of the plurality of display target objects are selected based on the calculated display size. This arrangement makes it possible to update the state of an unnoticeable display target object in the display image at a longer time interval, and that of a noticeable display target object at a shorter time interval in the virtual three-dimensional space. Consequently, deterioration in smoothness of the display image can be further efficiently made unnoticeable.

In one embodiment of the present invention, a plurality of invisible objects each having a shape in accordance with each of the plurality of display target objects and moving while following the display target object may be disposed in the virtual three-dimensional space, and the object selection means may calculate a display area in the display image, of each of the plurality of invisible objects projected onto the display image, as the display size of the display target object concerned. This makes it possible to obtain the display size of a display target object in a relatively simple process.

In another embodiment of the present invention, a plurality of invisible objects each having a shape in accordance with each of the plurality of display target objects and moving while following that display target object may be disposed in the virtual three-dimensional space, and the object selection means may project some or all vertices of the plurality of invisible objects onto the display image, and calculate a size of each of the plurality of invisible objects as a display size of the display target object concerned, based on positions in the display image, of the vertices projected. This makes it possible to obtain the display size of a display target object in a much simpler process.

BEST MODE FOR CARRYING OUT THE INVENTION

In the following, one embodiment of the present invention will be described based on the accompanying drawings.

Figure 1:
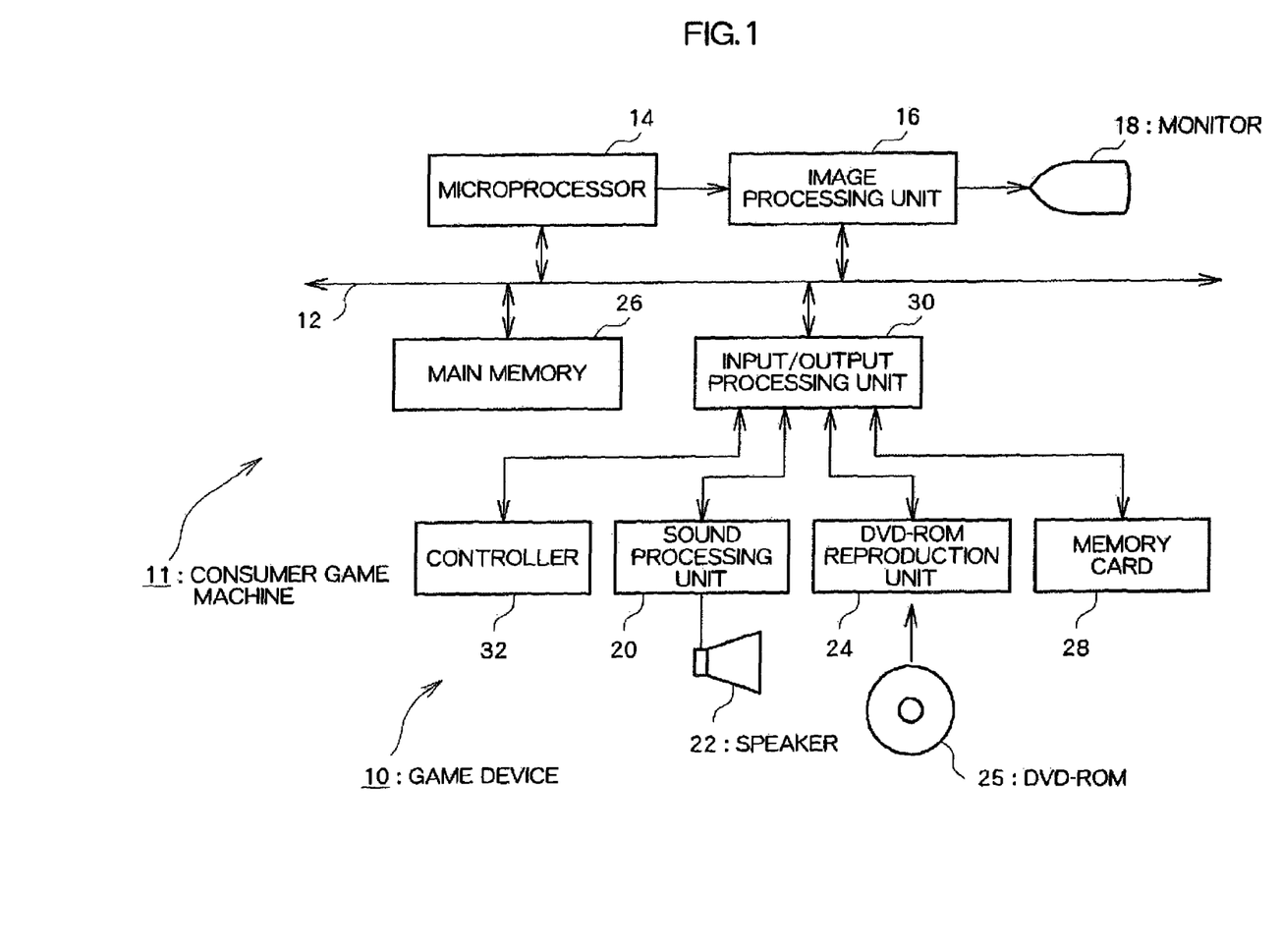
FIG. 1 is a diagram showing a hardware structure of a game device (an image processor) according to one embodiment of the present invention.

FIG. 1 is a diagram showing a hardware structure of a game device according to an embodiment of the present invention. The shown game device 10 is one embodiment of an image processor according to the present invention, and comprises a consumer game machine 11 having a DVD-ROM 25 and a memory card 28, or information storage media, mounted thereon, and a monitor 18 and a speaker 22 connected thereto. The monitor 18 may be a home-use television set receiver, and the speaker 22 may be a built-in speaker thereof. It should be noted that the DVD-ROM 25 is used here to provide a program to the consumer game machine 11, though any other computer readable information storage media, such as a CD-ROM, a ROM card, or the like, may be used. Alternatively, a program may be provided via a data communication network, such as the Internet, or the like, from a remote place to the consumer game machine 11.

The consumer game machine 11 is a publicly known computer game system comprising a microprocessor 14, an image processing unit 16, a main memory 26, an input/output processing unit 30, a sound processing unit 20, a controller 32, and a DVD-ROM reproduction unit 24. The microprocessor 14, the image processing unit 16, the main memory 26, and the input/output processing unit 30 are mutually connected via a bus 12 for data communication. To the input/output processing unit 30 are connected the controller 32, the sound processing unit 20, the DVD-ROM reproduction unit 24, and the memory card 28. The respective structural elements of the home-use game machine 11 other than the controller 32 are accommodated in an enclosure.

The microprocessor 14 controls the respective units of the consumer game machine 11 based on an operation system stored in a ROM (not shown), a program read from the DVD-ROM 25, and saved data read from the memory card 28, and provides a game to the player. The bus 12 is used for exchanging an address and/or data among the respective units of the consumer game machine 11. The main memory 26 comprises a RAM, for example, into which a program read from the DVD-ROM 25 and/or saved data read from the memory card 28 is written when required. The main memory 26 is used also as a working memory of the microprocessor 14. The image processing unit 16, comprising a VRAM, receives image data from the microprocessor 14, and renders a display image into the VRAM based on the received image data. Further, the image processing unit 16 converts the content of the rendered game image into a video signal, and outputs the video signal to the monitor 18 at a predetermined timing (every 1/60 second, here).

The input/output processing unit 30 is an interface via which the microprocessor 14 accesses the controller 32, the sound processing unit 20, the DVD-ROM reproduction unit 24, and the memory card 28. The sound processing unit 20 comprises a sound buffer, and reproduces and outputs, via the speaker 22, various sound data, such as game music, game sound effects, a message, and so forth, read from the DVD-ROM 25 and stored in the sound buffer. The DVD-ROM reproduction unit 24 reads a program from the DVD-ROM 25 according to an instruction from the microprocessor 14. The controller 32 is a general purpose operation input means via which the game player inputs various game operations. The memory card 28 comprises a nonvolatile memory (for example, EEPROM, or the like), and is removable relative to the home-use game machine 11. The memory card 28 stores saved data of various games.

Figure 2:
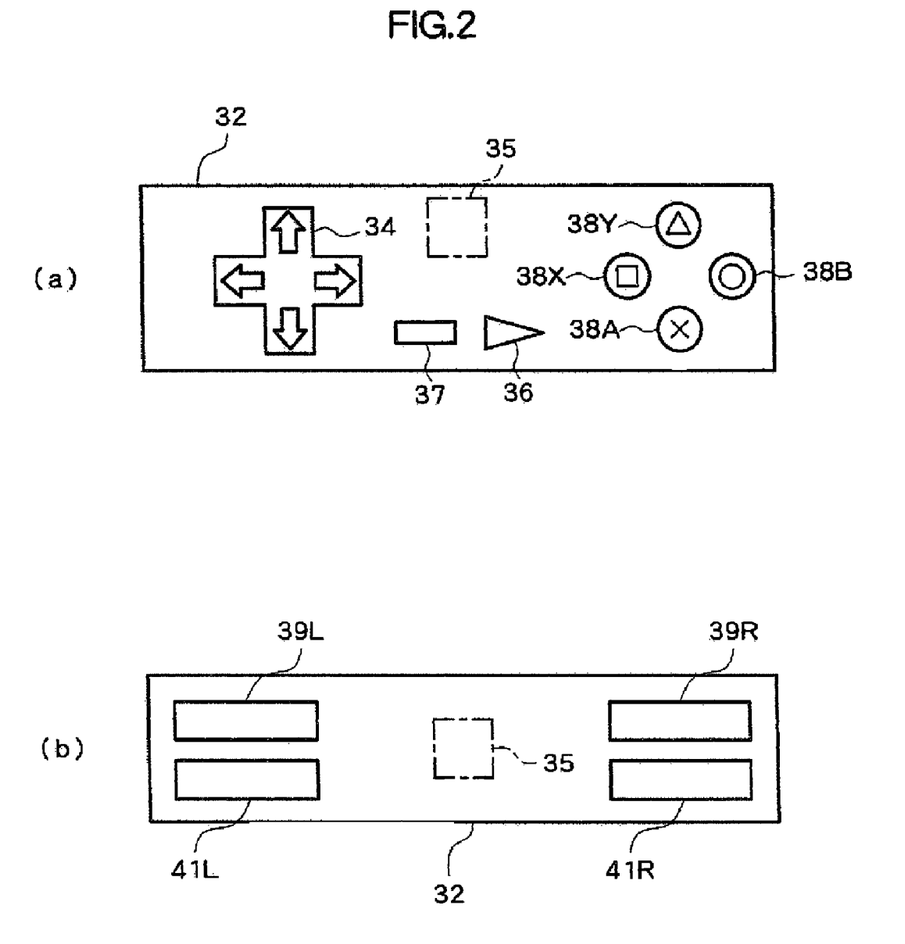
FIG. 2 is a diagram showing an external appearance of the controller.

FIG. 2 shows one example of the controller 32. The shown controller 32 is a general purpose game controller. As shown in FIG. 2(a), the controller 32 has a direction button 34, a start button 36, a selection key 37, and buttons 38X, 38Y, 38A, 38B, all formed on the front surface thereof, and also, as shown in FIG. 2(b), the buttons 39L, 39R, 41L, 41R on the top surface thereof. That is, the buttons 41L, 41R are formed on the top surface of the controller 32 on the left and right sides of the top surface closer to the front surface, and the buttons 39L, 39R, similarly formed but closer to the rear surface. The direction key 34 has a cross shape, and is generally used to specify a direction in which to move a character and a cursor. The start key 36 is a small triangle press button, and is generally used to start and forcibly end the game. The selection key 37 is used mainly for selecting a menu. The buttons 38X, 38Y, 38A, 38B, 39L, 39R, 41L, 41R are used for other game operations. With the controller 32 operated, operation data indicative of the content of the operation is input to the home-use game machine 11.

The controller 32 incorporates a vibrator 35. The vibrator 35, which comprises, for example, a piezoelectric element or an eccentrically weighted motor or the like, operates in response to a vibration-on instruction supplied from the microprocessor 14 to the controller 32, causing the controller 32 to vibrate, and stops operating in response to a vibration-off instruction supplied from the microprocessor 14 to the controller 32, causing the controller 32 to stop vibrating.

In the following, a technique employed by the game device 10 having the above-described hardware structure, for constructing a virtual three-dimensional space having a plurality of objects disposed therein in the main memory 26, then updating the image showing the picture of the virtual three-dimensional space for every predetermined period of time, and displaying the image on the monitor 18, will be described. In this embodiment, in particular, the state such as the position and posture of some of the plurality of objects disposed in the virtual three-dimensional space (ones having a larger display size, to be described later) are updated every time the image shown on the monitor 18 is updated, that is, at a time interval equal to that at which the image shown on the monitor 18 is updated (every 1/60 second, here), while those of the other objects (ones having a smaller display size) are updated at a double time interval (every 1/30 second, here).

Figure 3:
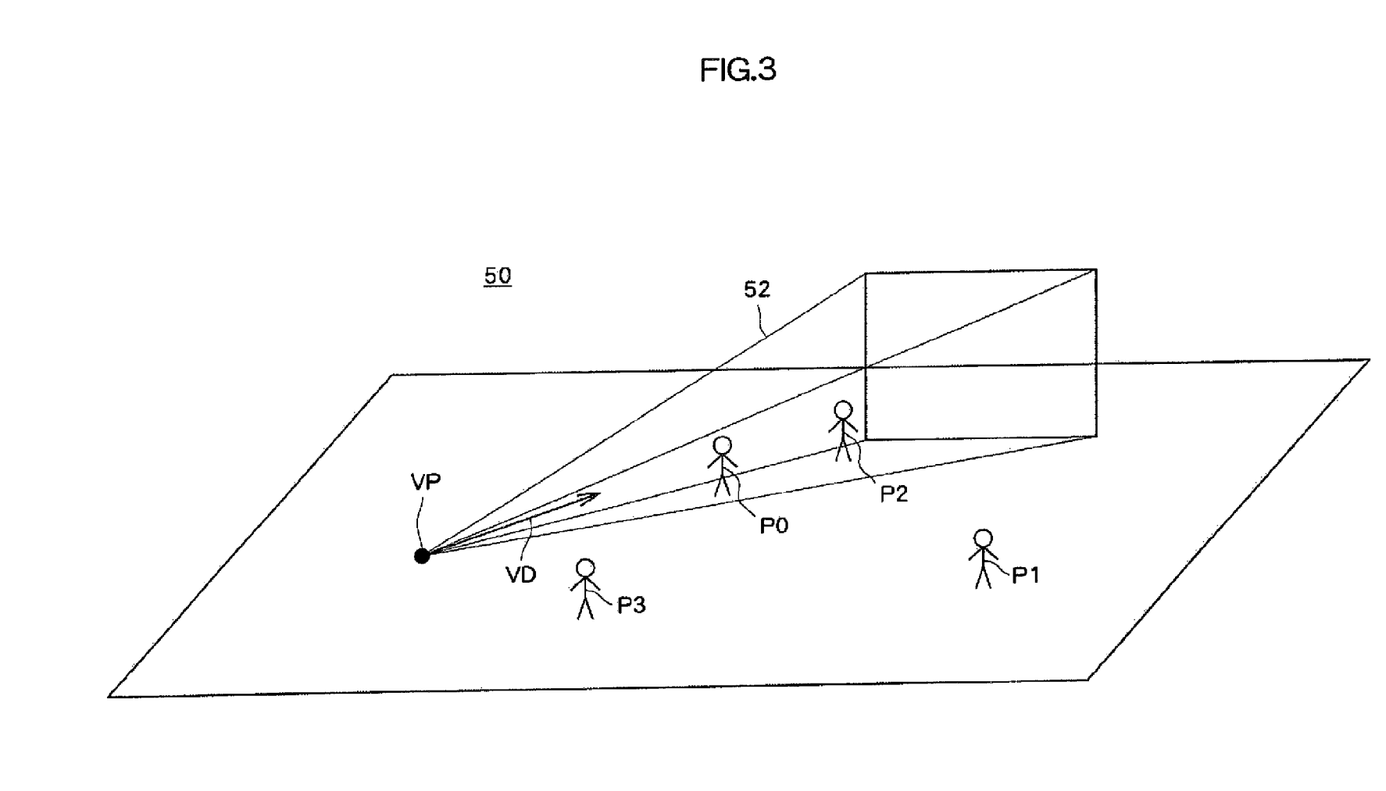
FIG. 3 is a diagram showing one example of a virtual three-dimensional space constructed in and managed by a game device.

FIG. 3 is a diagram showing one example of a virtual three-dimensional space constructed in the main memory 26. As shown, objects P0, P1, P2, P3, shaped like a human being, for example, are disposed in the virtual three-dimensional space (object space) 50 constructed in the main memory 26. As for the object P0, the state thereof (various information about the object, such as the position, posture, AI process, collision detection, an animation process, and so forth, necessary to update the game) is updated based on an operation signal input from the controller 32. As for the other objects P1, P2, P3, the positions, postures, and so forth thereof in the virtual three-dimensional space 50 are changed according to an algorithm into which publicly known art is applied.

Figure 4:
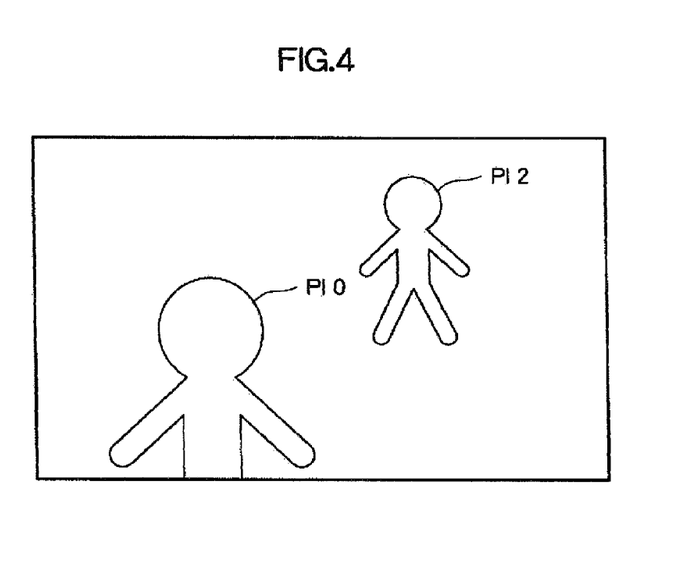
FIG. 4 is a diagram showing one example of an image shown on a monitor of the game device.

In the virtual three-dimensional space 50, a viewpoint VP is defined, which moves following the object P0 to be operated by the player. A viewing direction VD is defined with respect to the viewpoint VP, and a visual field range 52 is defined in the direction viewed from the viewpoint VP in the viewing direction VD. An object disposed in the visual field range 52 is projected onto a screen surface disposed in front of the viewpoint VP, to thereby produce a display image. The display image is rendered into the VRAM of the image processing unit 16, and the rendered display image in the VRAM is output to the monitor 18, whereby the picture of the virtual three-dimensional space 50 is visualized. Specifically, the display image represents the picture obtained by virtually viewing the virtual three-dimensional space 50 from the viewpoint VP in the viewing direction VD, with a range for visualization being defined by the visual field range 52. In FIG. 3, the objects P0, P2 are located in the visual field range 52, while the objects P1, P3 are located outside thereof. Therefore, as shown in FIG. 4, the images PI0 and PI2 representative of the objects P0 and P2, respectively, are included in the display image rendered into the VRAM and output to the monitor 18, though no image representing the objects P1 and P3 is included.

Figure 5:
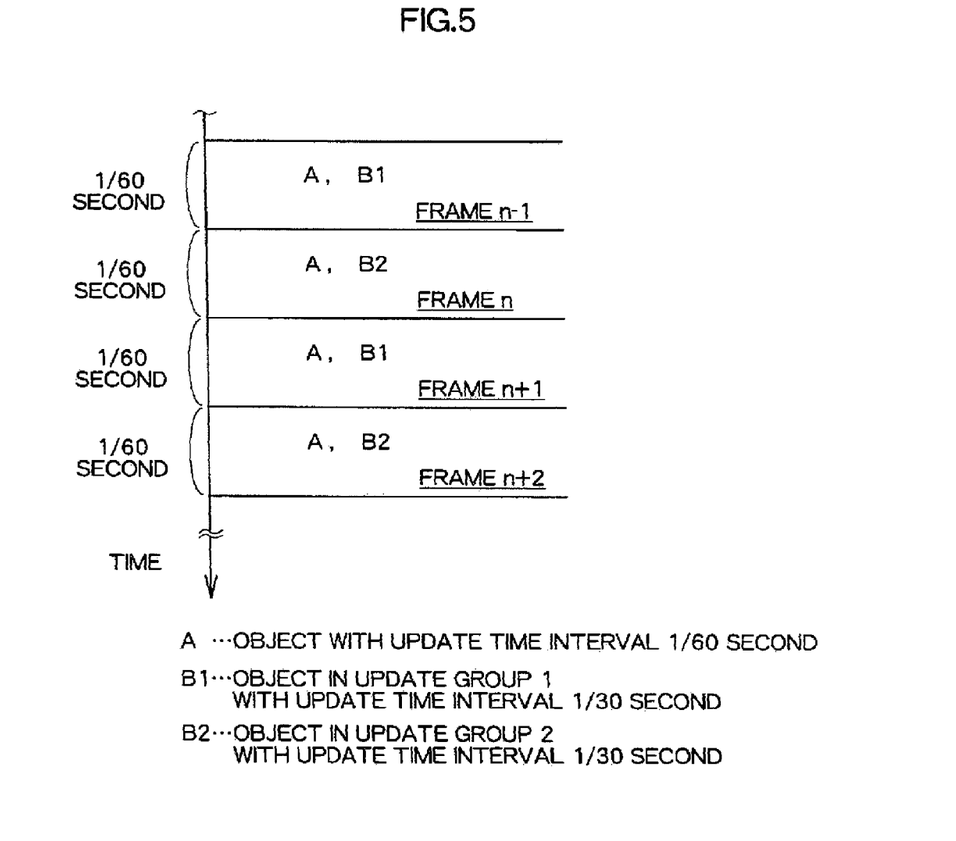
FIG. 5 is a diagram showing a group of objects of which positions, postures, and so forth are updated in a plurality of successive frames.

As described above, in the game device 10, the position, posture, and so forth of some of the plurality of objects disposed in the virtual three-dimensional space 50 are updated every 1/60 second, while those of the others are updated every 1/30 second. FIG. 5 illustrates this situation, in which the vertical axis indicates time, which is shown passing from the upper to lower sides of the drawing. With the unit of 1/60 second referred to as a frame, four successive frames n−1 to n+2 are shown here. In the first frame n−1, the position, posture, and so forth of an object belonging to the group A and those to the group B1 are updated. In the following frame n, the position, posture, and so forth of the object belonging to the group A and those to the group B2 are updated. In the further following frame n+1, the position, posture, and so forth of the object belonging to the group A and those to the group B1 are updated. In the yet further following frame n+2, the position, posture, and so forth of the object belonging to the group A and the object belonging to the group B2 are updated. Here, the object belonging to the group A is an object having a display size larger than a predetermined value, at which the concerned object is shown in the display image shown in FIG. 4, while the objects belonging to the groups B1 and B2 are objects each having a display size equal to or smaller than the predetermined value. To which of the groups B1 and B2 each object belongs is determined based on the number of objects belonging to each of the group B1 and B2, for example.

As shown, for the object belonging to the group A, the position, posture, and so forth thereof are updated for every frame, and, for the objects belonging to the groups B1 and B2, those are alternately updated for every frame, that is, for every second frame. That is, the position, posture, and so forth of the object belonging to the group A are updated every 1/60 second, while those to the groups B1 and B2 are updated every 1/30 second.

The above-described arrangement in which the position, posture, and so forth of some objects are updated every 1/60 seconds, while those of the others are updated every 1/30 seconds makes it possible to reduce the number of objects for which position, posture, and so forth need to be calculated in each frame. As a result, the position, posture, and so forth of an increased number of objects can be regularly updated.

Figure 6:
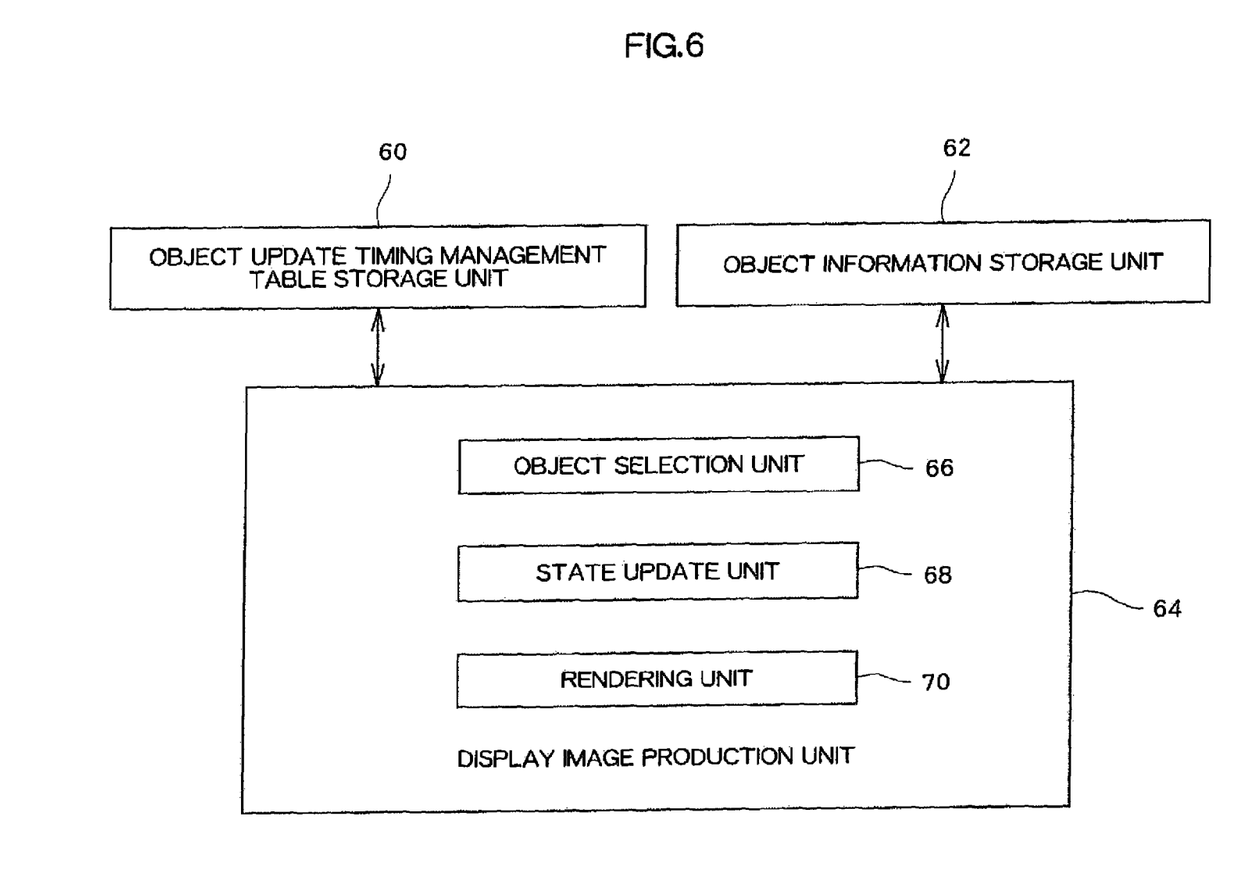
FIG. 6 is a functional block diagram of a game device according to an embodiment of the present invention.

In the following, the function of the game device 10 will be described. FIG. 6 is a functional block diagram of the game device 10, showing mainly the functions relevant to the present invention among those which are realized by the game device 10. These functions are realized by executing a program stored in the DVD-ROM 25 in the home-use game machine 11.

As shown, the game device 10 comprises, in terms of function, an object update timing management table storage unit 60, an object information storage unit 62, and a display image production unit 64. The display image production unit 64 comprises an object selection unit 66, a state update unit 68, and a rendering unit 70. The object update timing management table storage unit 60 comprises a main memory 26, for example, as a major component, and stores an object update timing management table.

Figure 7:
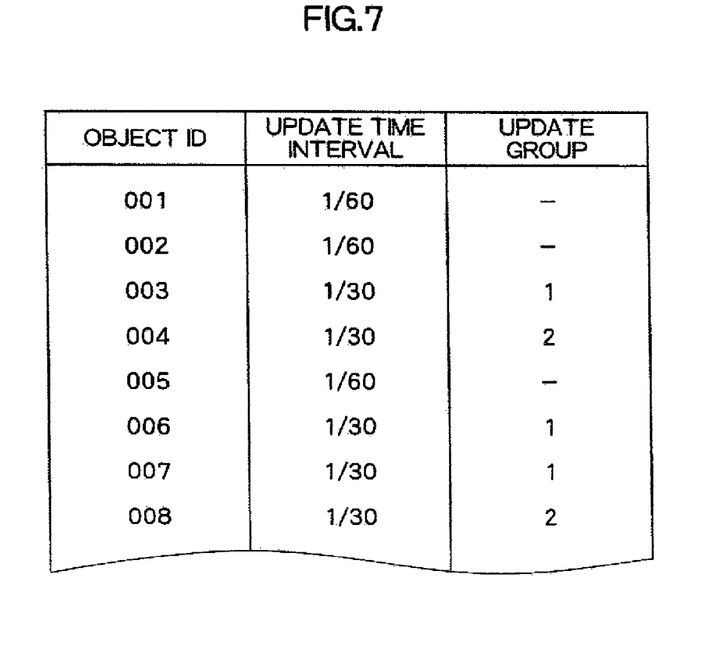
FIG. 7 is a diagram showing one example of an object update timing management table.

FIG. 7 shows one example of the object update timing management table. As shown, the object update timing management table includes an object ID, an update time interval, and an update group, all shown in association with one another. The object ID identifies an object disposed in the virtual three-dimensional space 50. The update time interval refers to a time interval at which the position, posture, and so forth of an object identified by the corresponding object ID in the virtual three-dimensional space 50 should be updated. In this embodiment, either a 1/60 or 1/30 second interval is shown. The update group identifies a group of objects for which positions, postures, and so forth are updated at the same interval. As described above, two object groups for 1/30 second-update are available, in which the positions, postures, and so forth of the objects in the respective groups are calculated, alternately using the sequentially arriving frames. The update group indicates, when an object identified by a corresponding object ID is to be updated every 1/30 second, whether the position, posture, and so forth thereof should be updated in an odd or even-numbered frame. No update group is shown for an object to be updated every 1/60 second.

Returning to FIG. 6, the object information storage unit 62 comprises the main memory 26 and the DVD-ROM 25 as major components, and stores information about the current position, posture, and so forth of all objects disposed in the virtual three-dimensional space 50.

The display image production unit 64, which comprises the microprocessor 14 as a major element, creates an image representative of a game screen image, or a display image, based on the content shown in the object update timing management table 60, the content stored in the object information storage unit 62, other information stored in the DVD-ROM 25, and an operation signal input from the controller 32, and renders the created display image into the VRAM in the image processing unit 16.

In particular, the object selection unit 66 selects some of the plurality of objects disposed in the virtual three-dimensional space 50. Specifically, the object selection unit 66 calculates the display size of each object, and updates the object update timing management table according to the calculated value. That is, the object selection unit 66 calculates a display size of each object in the display image in each frame, then sets an update time interval of 1/30 seconds with respect to an object for which display size is equal to or smaller than a predetermined reference value, and so records in the object update timing management table. In the above, if the update time interval for the concerned object is already set as 1/30 second, the relevant update group, which is already accordingly assigned, is maintained as is. Meanwhile, if the update interval for the concerned object is already set as 1/60, the 1/60 second-update interval is changed to a 1/30 second-update interval, and update group information is newly assigned. In setting an update group, it is preferable that the current number of objects belonging to the respective update groups are found out, and one of the update groups, which includes a fewer number of objects belonging thereto, is assigned.

Meanwhile, the object selection unit 66 sets an update time interval of 1/60 second with respect to an object for which display size is larger than the predetermined reference value, and so records in the object update timing management table. As described above, some of the plurality of objects are selected based on the display size, and the update time intervals thereof are recorded in the object update timing management table, based on the result of the selection.

The state update unit 68 updates the position, posture, and so forth of the object selected by the object selection unit 66 in the virtual three-dimensional space 50, at a time interval different from that for the others. Specifically, the state update unit 68 calculates the position, posture, and so forth of each object as follows.

That is, initially, the state update unit 68 reads the object update timing management table from the object update timing management table storage unit 60 every arrival of the start timing of each frame, and reads therefrom the object ID of an object for which position, posture, and so forth should be updated in the current frame. Specifically, the state update unit 68 manages the update group of an object for which position, posture, and so forth should be updated in the current frame (that is, whether the current frame is an odd numbered frame and the position, posture, and so forth of an object belonging to the update group 1 are thus to be updated or the current frame is an even numbered frame and the position, posture, and so forth of an object belonging to the update group 2 are thus to be updated). That is, suppose that the update group 1 is updated in the current frame, the state update unit 68 updates the update group 2 in the following frame, and vice versa. Then, the state update unit 68 searches for a record (a row) having information, shown in the update group column in the object update timing management table, specifying an update group (1 or 2) identical to the update group designated to be updated in the current frame, and then reads an object ID recorded in association with that update group, as an object ID identifying an object for which position, posture, and so forth are to be updated in the current frame.

In addition, the state update unit 68 searches for a record having "1/60" shown in the update time interval column in the object update timing management table, and reads the object ID recorded in association with that update time interval, as an object ID identifying an object for which position, posture, and so forth should be updated in the current frame.

Having selectively read the object ID from the object update timing management table, the state update unit 68 calculates the position, posture, and so forth of the object identified by the read object ID, and stores the result in the object information storage unit 62. This arrangement makes it possible to update the position, posture, and so forth of the object selected by the object selection unit 66 in the virtual three-dimensional space 50 at a time interval different from that for the other objects in the virtual three-dimensional space 50.

Based on the latest position, posture, and so forth of each object stored in the object information storage unit 62, the rendering unit 70 renders a display image into the VRAM of the image processing unit 16 every predetermined period of time (1/60 second, here). The display image is read every 1/60 second, and shown on the monitor 18.

Figure 8:
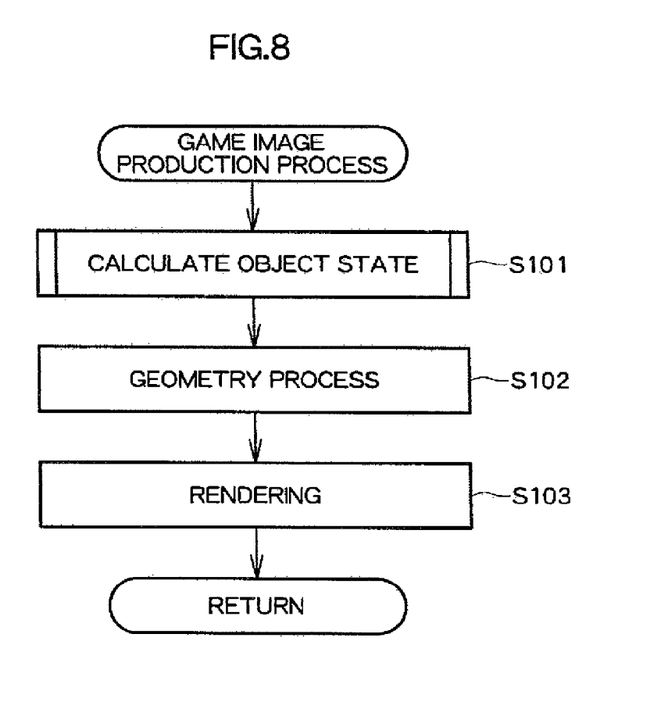
FIG. 8 is a flowchart of a display image production process.

Here, a display image production process by the game device 10 will be described. FIG. 8 is a flowchart of a display image production process carried out by the game device 10. This process is carried out in the game device 10 for every frame (every predetermined period of time (1/60 second)) based on a program stored in the DVD-ROM 25.

As shown, the microprocessor 14 (the object selection unit 66 and the state update unit 68) of the game device 10 calculates various states, such as the positions, postures, and so forth of each object in the world coordinate system based on a game program and game data read from the DVD-ROM 25 and the content stored in the object update timing management table storage unit 60 and object information storage unit 62 (S101). In addition, a viewpoint VP, a viewing direction VD, and a visual field range 52 are also calculated at S101. The process at S101 will be described in detail with reference to FIGS. 9 and 10.

In the game image production process, subsequently, the microprocessor 14 (the rendering unit 70) carries out a geometry process based on the content stored in the object information storage unit 62 (S102). In the geometry process, the coordinates in the world coordinate system are converted into those in the viewpoint coordinate system. In addition, the color information about the vertex of each of the polygons forming the object is modified based on the light source information (the color and position of the light source). A clipping process is additionally carried out.

Thereafter, the microprocessor 14 (the rendering unit 70) carries out a rendering process (S103). In this process, the microprocessor 14 sends information about the vertex coordinates, vertex color information, texture coordinates, and an alpha value of each of the polygons belonging to the visual field range 52 to the image processing unit 16, which in turn forms a display image in the VRAM based on the received information. The display image formed in the VRAM of the image processing unit 16 is read at a predetermined timing, and shown on the monitor 18.

Figure 9:
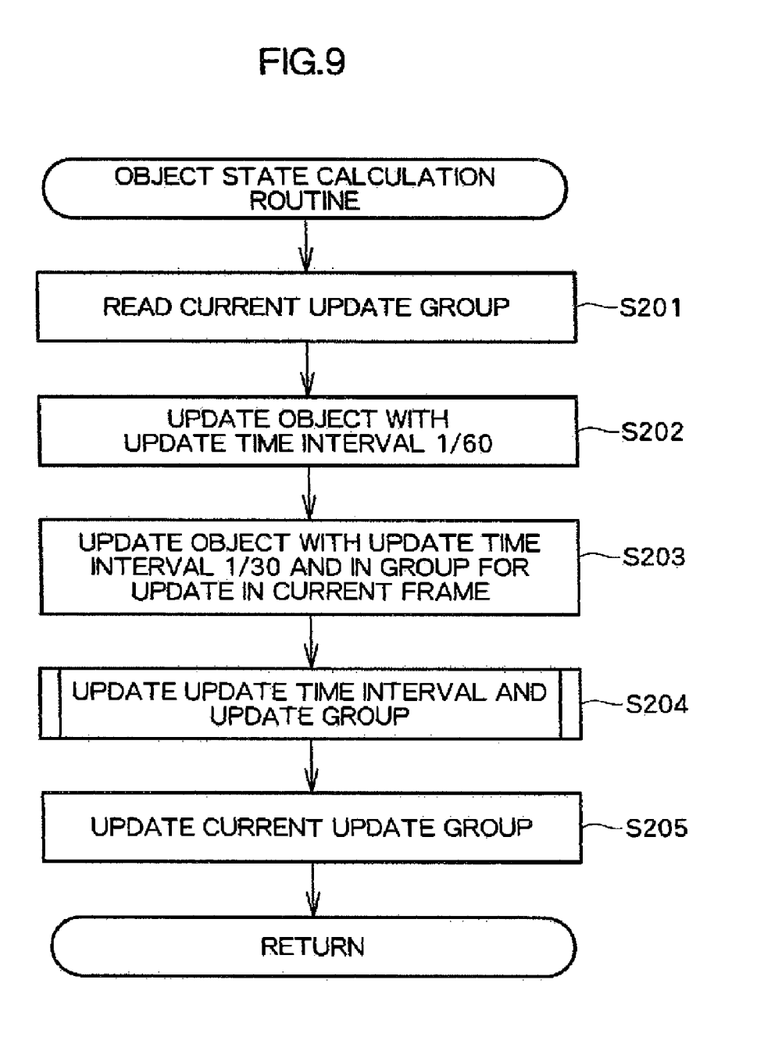
FIG. 9 is a flowchart of an object state calculation routine.

FIG. 9 is a flowchart of an object state calculation routine. The flowchart shows the details of the process at S101 in FIG. 8. In the object state calculation routine, initially, the state update unit 68 reads the update group to be updated in the current frame (S201). Thereafter, the state update unit 68 reads the object ID of an object with respect to which the update time interval is set as 1/60 seconds, from the object update timing management table storage unit 60, then calculates the position, posture, and so forth of the object identified by the object ID, and stores the calculation result in the object information storage unit 62 (S202). In addition, the state update unit 68 reads the object ID of an object with respect to which the update time interval is set as 1/30 second and an update group identical to that which is read at S201 is also set, from the object update timing management table storage unit 60, then calculates the position, posture, and so forth of the object identified by the object ID, and stores the calculation result in the object information storage unit 62 (S203).

Thereafter, the object selection unit 66 updates the content stored in the object update timing management table storage unit 60 by, specifically, updating the update time interval and update group, shown in the object update timing management table, of the object currently located in the visual field range 52 (S204). This process will be described later in detail with reference to FIG. 10.

Subsequently, the state update unit 68 updates the update group read at S201 (S205) by, specifically, when the current group 1 is read at S201, changing the update group to the current group 2, and vice versa. With this arrangement, an object belonging to the update group 1 and that to the update group 2, among those with respect to which the update time interval is set as 1/30 second, alternately become a target of calculation as to the position, posture, and so forth thereof.

Figure 10:
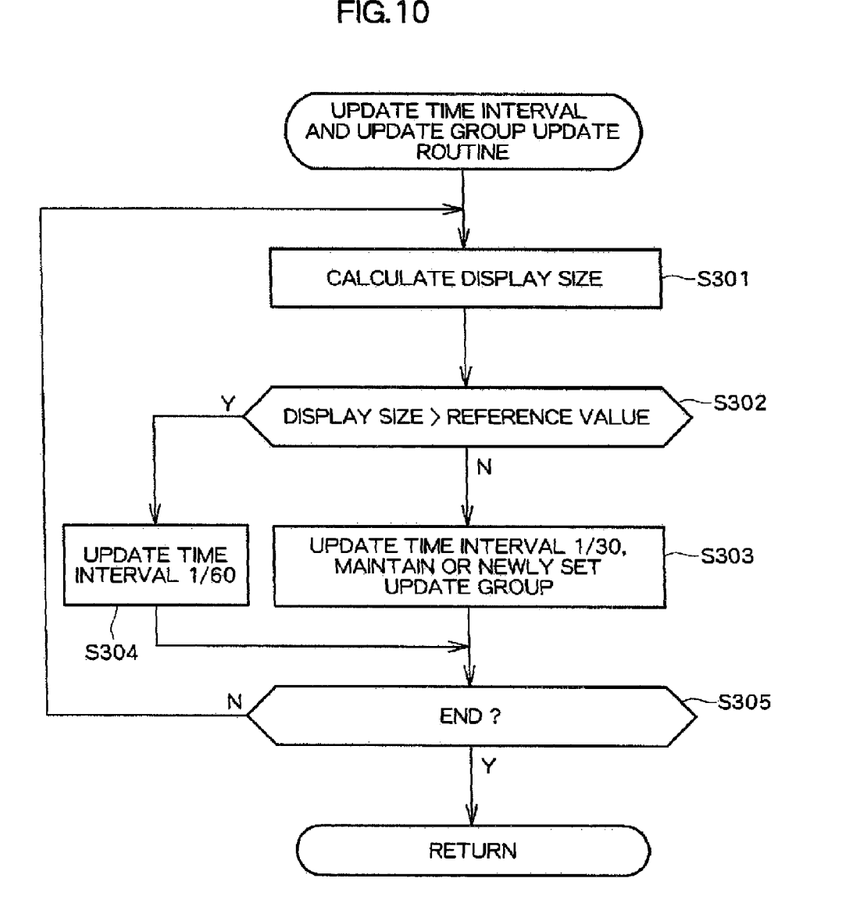
FIG. 10 is a flowchart of an update time interval and an update group update routine.
Figure 11:
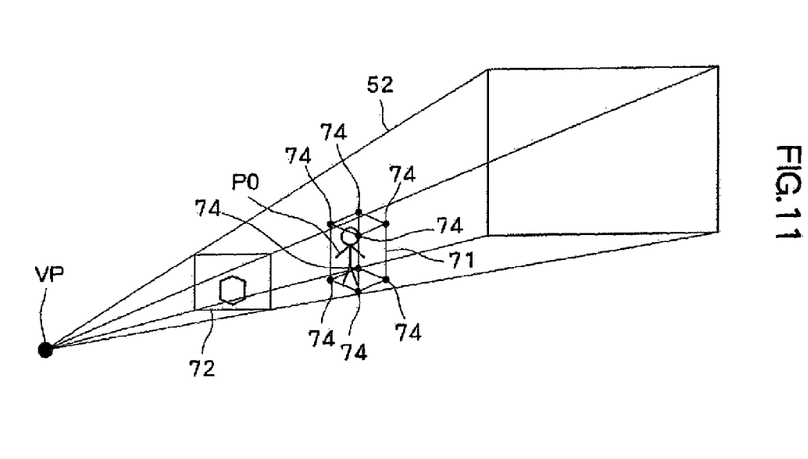
FIG. 11 is a diagram explaining calculation of a display size of a display target object.

FIG. 10 is a flowchart of a routine to update the update time interval and the update group. This flowchart shows the details of the process at S204 in FIG. 9. In this process, initially, the display size of one of the objects located in the visual field range 52 is calculated (S301). Specifically, as shown in FIG. 11, an invisible object 71 (not shown on the monitor 18) surrounding the object (the object P0, here) is disposed in the virtual three-dimensional space 50, and projected onto a projection surface disposed in front of the viewpoint VP, to thereby produce a projected image. The projection surface 72 is prepared separately from the scene surface for use in production of the display image showing the picture inside the virtual three-dimensional space 50, and placed at the same position as that of the screen surface, or parallel to the screen surface.

Figure 12:
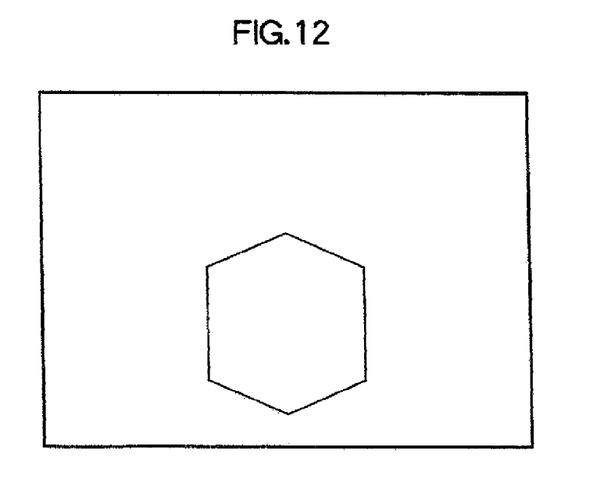
FIG. 12 is a diagram showing an image projected on a surface for use in calculation of a display size of the display target object.

FIG. 12 shows one example of a projected image thus obtained. In the shown projected image, the area where the invisible object 71 is projected is colored, with the other not colored. The number of pixels constituting the colored area is calculated, to thereby obtain the area of the object 71. In one embodiment of the present invention, this area is defined as the display size of the object to be displayed (the object P0 in FIG. 11).

Figure 13:
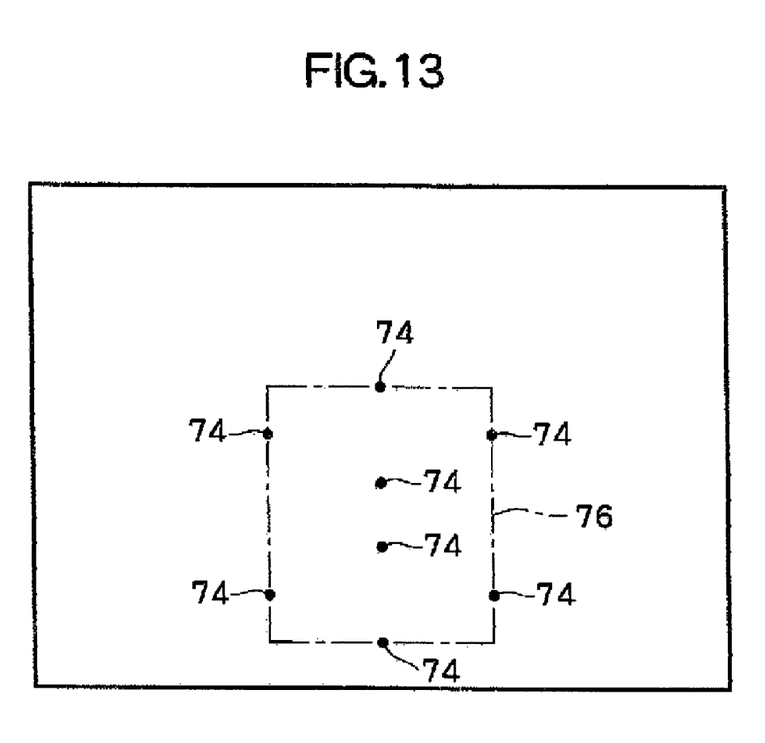
FIG. 13 is a diagram showing an image projected on a surface for use in calculation of a display size of the display target object.

In another embodiment, the vertex 74 of the object 71 is projected onto the projection surface 72, and the position coordinates of the projected vertex 74 on the projection surface 72 are obtained. Thereafter, the two vertices 74 that are furthest apart in a predetermined direction (for example, in the vertical direction) are selected from among those vertices 74 projected, and the distance (defined as L1) between them is calculated. Further, the two furthest apart vertices 74 in the direction perpendicular to the predetermined direction are selected, and the distance (defined as L2) between them is also calculated. Then, the distance L1 is multiplied by the distance L2 to calculate the area of a rectangle 76 in external contact with the vertex 74 group. The thus calculated area of the rectangular 76 in external contact may be used as the display size of the object to be displayed in one embodiment of the present invention.

Returning to FIG. 10, whether or not the thus calculated display size is larger than a reference value is determined (S302). With the display size determined to be equal to or smaller than the reference value, the update time interval of the object is set at 1/30 seconds, and the update group is maintained or newly set, as described above (S303), with the content of this process being written into the object update timing management table. Meanwhile, with the display size determined to be larger than the reference value, the update time interval of the object is set at 1/60 (S304), with the content of this process being also written into the object update timing management table. The processes at S301 to S304 are repeated with respect to all objects located in the visual field range 52 (S305).

According to the game device 10 in the above described embodiment, the display size of an object to be shown on the monitor 18 is calculated, and the position, posture, and so forth of an object having the display size larger than the reference value are updated every 1/60 second, while those of an object having the display size equal to or smaller than the reference value are updated every 1/30 second. With this arrangement, it is possible to regularly update the positions, postures, and so forth of an increased number of objects as a whole. Moreover, as the position, posture, and so forth of only limited objects are updated at a longer time interval in the virtual three-dimensional space, deterioration in smoothness of the display image can be made unnoticeable. Moreover, as an object unnoticeable in the display image is picked up as an object for which position, posture, and so forth are updated in a longer time interval, it is possible to efficiently keep the deterioration in smoothness of the display image unnoticeable.

It should be noted that the present invention is not limited to the above-described embodiment. For example, the present invention is applicable not only to an action game, but also to image processing for games in any genre, including match games, shooting games, such as gun shooting games, and so forth.

The invention claimed is:
1. An image processor for producing and displaying a display image showing a picture obtained by viewing a virtual three-dimensional space where a viewpoint and a plurality of display target objects are disposed, from the view point, comprising:
   means for calculating a display size, in the display image, of each of the plurality of display target objects;
   means for selecting some of the plurality of display target objects based on the calculated display size of each of the plurality of display target objects; and
   means for updating a state of the selected objects in the virtual three-dimensional space at a time interval different from that for objects other than said selected some of the plurality of display target objects in the virtual three-dimensional space, based on said calculated display size, wherein each of the plurality of display target objects is displayed in said display image.

2. The image processor according to claim 1, wherein
a plurality of invisible objects, each having a shape in accordance with each of the plurality of display target objects and moving while following that display target object, are disposed in the virtual three-dimensional space, and
the means for selecting calculates a display area in the display image, of each of the plurality of invisible objects projected onto the display image as the display size of the display target object concerned.

3. The image processor according to claim 1, wherein
a plurality of invisible objects each having a shape in accordance with each of the plurality of display target objects and moving while following that display target object are disposed in the virtual three-dimensional space, and
the means for selecting projects some or all vertices of the plurality of invisible objects onto the display image, and calculates a size of each of the plurality of invisible objects as a display size of the display target object concerned, based on positions in the display image, of the vertices projected.

4. The image processor of claim 1, wherein a first one said display target objects is controlled by a player, and a second one of said objects is controlled by an algorithm.

5. The image processor of claim 1, wherein first ones said display target objects above a predetermined display size are updated at a first interval, and second ones said display target objects at or below a predetermined display size are updated at a second interval.

6. The image processor of claim 5, wherein said second interval is twice as long as said first interval.

7. The image processor of claim 5, wherein when said updating results in said first one of said display target objects being at or below said predetermined display size, said first one of said display target objects becomes said second one said display target objects and is updated at said second interval.

8. The image processor of claim 7, wherein said first one of said display target objects, when becoming said second one said display target objects, is assigned to one of a first group and a second group having fewer of said second one of said display target objects.

9. An image processing method performed by a computer system for producing a display image showing a picture obtained by viewing a virtual three-dimensional space where a viewpoint and a plurality of display target objects are disposed, from the view point, comprising:
calculating a display size, in the display image, of each of the plurality of display target objects;
selecting some of the plurality of display target objects based on the calculated display size of each of the plurality of display target objects; and
updating a state of the objects in the virtual three-dimensional space at a time interval different from that for objects other than said selected some of the plurality of display target objects in the virtual three-dimensional space, based on said calculated display size,
wherein each of the plurality of display target objects is displayed in said display image.

10. The image processing method of claim 9, wherein a first one said display target objects is controlled by a player, and a second one of said objects is controlled by an algorithm.

11. The image processing method of claim 9, wherein first ones said display target objects above a predetermined display size are updated at a first interval, and second ones said display target objects at or below a predetermined display size are updated at a second interval.

12. The image processing method of claim 11, wherein said second interval is twice as long as said first interval.

13. The image processing method of claim 11, wherein when said updating results in said first one of said display target objects being at or below said predetermined display size, said first one of said display target objects becomes said second one said display target objects and is updated at said second interval.

14. The computer readable information non-transitory storage medium of claim 13, wherein when said updating results in said first one of said display target objects being at or below said predetermined display size, said first one of said display target objects becomes said second one said display target objects and is updated at said second interval.

15. A computer readable information non-transitory storage medium storing a program causing a computer to function as:
means for producing and displaying a display image showing a picture obtained by viewing a virtual three-dimensional space where a viewpoint and a plurality of display target objects are disposed, from the view point;
means for calculating a display size, in the display image, of each of the plurality of display target objects;
means for selecting some of the plurality of display target objects based on the calculated display size of each of the plurality of display target objects; and
means for updating a state of the selected objects in the virtual three-dimensional space at a time interval different from that for objects other than said selected some of the plurality of display target objects in the virtual three-dimensional space, based on said calculated display size,
wherein each of the plurality of display target objects is displayed in said display image.

16. The computer readable information non-transitory storage medium of claim 15, wherein a first one said display target objects is controlled by a player, and a second one of said objects is controlled by an algorithm.

17. The computer readable information non-transitory storage medium of claim 15, wherein first ones said display target objects above a predetermined display size are updated at a first interval, and second ones said display target objects at or below a predetermined display size are updated at a second interval.

18. The computer readable information non-transitory storage medium of claim 17, wherein said second interval is twice as long as said first interval.

19. The image processing method of claim 17, wherein said first one of said display target objects, when becoming said second one said display target objects, is assigned to one of a first group and a second group having fewer of said second one of said display target objects.

20. The computer readable information non-transitory storage medium of claim 19, wherein said first one of said display target objects, when becoming said second one said display target objects, is assigned to one of a first group and a second group having fewer of said second one of said display target objects.

* * * * *